United States Patent [19]

Berg et al.

[11] Patent Number: 4,640,947

[45] Date of Patent: Feb. 3, 1987

[54] ADHESIVE MEDIUM FOR THE BONDING OF SURFACES IN THE AMMUNITION CONTAINING EXPLOSIVE CHARGES

[75] Inventors: Günter Berg, Nonnweiler; Otmar Müller, Nohfelden; Rainer Esters, Solingen, all of Fed. Rep. of Germany

[73] Assignee: Diehl GmbH & Co., Fed. Rep. of Germany

[21] Appl. No.: 738,670

[22] Filed: May 28, 1985

[30] Foreign Application Priority Data

Jun. 1, 1984 [DE] Fed. Rep. of Germany ....... 3420544

[51] Int. Cl.$^4$ ...................... C06B 21/00; C06B 45/22
[52] U.S. Cl. .................................... 524/109; 524/513; 264/3.1; 149/11; 149/12; 149/19.5; 149/19.91
[58] Field of Search .................. 524/109, 513; 149/11, 149/12, 19.5, 19.91; 264/3 R

[56] References Cited

U.S. PATENT DOCUMENTS

| | | | |
|---|---|---|---|
| 2,407,967 | 9/1946 | Thomson | 149/11 |
| 3,107,186 | 10/1963 | Scurlock et al. | 149/19.91 |
| 3,897,283 | 7/1975 | Wiebke et al. | 264/3 R |
| 3,956,038 | 5/1976 | Duguet et al. | 149/11 |
| 4,025,591 | 5/1977 | Pendergast | 149/19.91 |
| 4,049,611 | 9/1977 | Hirzy | 524/114 |
| 4,097,446 | 6/1978 | Abolins et al. | 524/513 |
| 4,385,948 | 5/1983 | Reed et al. | 149/11 |
| 4,486,561 | 12/1984 | Chung et al. | 524/109 |
| 4,497,920 | 2/1985 | Thomas et al. | 524/109 |
| 4,522,965 | 6/1985 | Waniczek et al. | 524/109 |

*Primary Examiner*—Ronald W. Griffin
*Attorney, Agent, or Firm*—Scully, Scott, Murphy & Presser

[57] ABSTRACT

An adhesive medium for the bonding of surfaces in ammunition which contains explosive charges. The adhesive medium essentially consists of: 14 to 46% by weight of a binding resin non-hardening in oxygen, having a softening point below the melting point of the explosive; 6 to 26% by weight of a pigment composition; and 24 to 66% by weight of a polymeric solvent composition.

5 Claims, No Drawings

ADHESIVE MEDIUM FOR THE BONDING OF SURFACES IN THE AMMUNITION CONTAINING EXPLOSIVE CHARGES

BACKGROUND OF THE INVENTION

1. Field of the Invention

The present invention relates to an adhesive medium for the bonding of surfaces in ammunition which contains explosive charges.

For cast or molded explosive charges it is necessary to provide a close fit with the inner wall of the charge carrier. Herein, it is a basic prerequisite that the adhesive medium which provides the adherence with the wall or surface is compatible with the explosive.

2. Discussion of the Prior Art

The heretofore employed adhesive media, which have not been published are constituted on the basis of alkyde resins or bitumins. An adhesive medium which has been internally developed within the applicants' facilities contains an admixture of TNT. The alkyde resins which are employed as binders cure or harden in air or oxygen. When applied to projectile casings that type of adhesive medium will always become harder during storage, such that subsequent to the passage of a certain drying period or storage period, it will be more difficult to attain a dissolution of the adhesive medium onto the explosive during casting, which can be only partially compensated for by a higher preheating temperature of the projectile casing prior to the casting. However, in this instance there are encountered set limits. Namely, when the temperature of the projectile case is higher than the melting temperature of the explosive, then during the casting of TNT, the TNT crystals which are necessary as nuclei formers are always again melted within the smelt, which leads to "coarsely crystalline matrixes", particularly along the edge zone. During the casting of "Composition B" there is retarded the solidification of the TNT, which causes an increased sedimentation of the hexogen. Both effects are not permissible in practice.

Furthermore, the degree of adhesiveness of this adhesive medium is extremely low while the cohesiveness is extremely high. As a consequence, it is disadvantageous that the cast-in explosive will dissolve on the adhesive medium to the desired extent, and in the case of utilization in projectile charges, this will rupture in the boundary layer with the explosive.

In a further adhesive medium which is based on bitumen, there is present the necessary adhesion with the explosives in charge carriers; however, the degree of cohesion is too low. As a result, during firing of the projectile, the layer of the adhesive medium can rupture internally.

Both of the adhesive media are subject to the common disadvantage in that the explosive charge which is cast into the projectile casing will lift away from the projectile base during the cooling phase, and consequently, a base gap can be formed. In such explosive charges the adhesion to the wall or surface which is produced will not be adequate to avoid the relative movement of the explosive charge with respect to the projectile casing during the firing of the projectile. As a result, the explosive charge strikes with an adiabatic compaction of about 200° C. against the bottom of the projectile. This will lead to a spontaneous detonation of the explosive charge in the barrel of the weapon.

For adhesive media which are employed for the bonding of surfaces in ammunition which contain explosive charges, besides providing good properties with respect to adhesiveness and cohesiveness, it is also necessary to demand a rational processing capability.

SUMMARY OF THE INVENTION

Accordingly, it is an object of the present invention to provide an adhesive medium which, with regard to its properties of adhesiveness and or cohesiveness, affords a close fit or fixed seating of explosive charges in projectile casings while concurrently avoiding the formation of a base gap, through the application of a rationally implemented production process. Moreover, there must also be ensured that explosive pieces which are interconnected by means of the adhesive medium, cannot be separated from each other within the thickness of the adhesive medium layer during accelerations.

The foregoing object of the present invention is achieved through the intermediary of an adhesive medium which is employed for the bonding surfaces in ammunition containing explosive charges, wherein the adhesive medium comprises:

(a) 14 to 46% by weight of a binding resin non-hardening in oxygen, having a softening point below the melting point of the explosive;

(b) 6 to 26% by weight of a pigment composition; and (c) 24 to 66% by weight of a polymeric solvent composition.

The binding resin has a composition comprising 12 to 30% by weight of an interpolymer of approximately 75% vinyl chloride and approximately 25% vinyl monomers, such as vinyl butylether, 1 to 8% by weight of an oil-free polyester, and 1 to 8% by weight of an epoxy-modified triglyceride.

Furthermore, the pigmentation has a composition comprising 1 to 3% by weight of colored carbon black as coloring and cover-forming components, 5 to 20% by weight of magnesium-aluminum silicate to improve the adhesion to metal; and 0.1 to 3% by weight of Quelltone for protection against settling.

Additionally, the solvent has a composition comprising 20 to 40% by weight of aromatic hydrocarbons, 1 to 10% by weight of aliphatic hydrocarbons, 1 to 8% by weight of alcohols, and 2 to 8% by weight of ester.

In a specific instance, the medium is constituted of 30% PVC interpolymerisate, 3% oil-free polyester, 30% xylol, 7% epoxy-modified triglyceride, 0.5% bentone, 1.5% carbon black, 5% ethyl glycol, 13% talcum, 5% butyl acetate, and 5% white spirits.

DETAILED DESCRIPTION

Further advantages, modifications and features of the invention may be readily ascertained from the following detailed description thereof as set forth hereinbelow.

In accordance with the invention, depending upon the type of utilization and the physical drying, there is presented an adhesive medium which is suitable for all explosives, the adhesive strengths of which with respect to the applicable substrate, such as metal, explosive, are higher than the contractive forces of the explosive which are encountered during the resolidification thereof. The breaking elongation thereof is equal to or greater than that of the explosive. For projectiles, there is present a degree of adhesiveness to a wall or surface which, even under conditions of high accelerations, in the main axis and in the direction of spin, will provide in the metallic casings a fixed seating of the explosive charge while avoiding the formation of a bottom or base gap.

Essential to the invention is the melting interval of the binding medium combination which is correlated with the explosive. The molten phases solvate each other, as a result of which there is achieved an intimate intersticing of the resolidified phases. The pigment composition prevents the running off of the lacquer coatings during the heating up of the casings to casting temperature, so as to enable the utilization of a rational production process at a constant remaining quality of adhesiveness to the wall surface.

An excellent adhesion of cast explosive charges to the walls of projectile casings is achieved at a dry coating thickness of $\geq 30$ μm.

For cast lumps and molded castings which are to be interconnected, there is achievable an outstanding bond immediately subsequent to the production of the explosive pieces through the compressing of coated explosive bodies. The dry coating consists of a thickness of 100 to 200 μm, insofar as there is operated with ram pressure. With an increasing ram pressure, the thickness of the dry coating can be selected in order to achieve the assured bonding.

As a result of the invention, with regard to the adhesiveness to a wall by the explosive, the ammunition is no longer, as was common heretofore, the weakest link in the chain of a weapon system. This can be substantiated in that, upon the pressing out of an explosive charge from a projectile casing, the layer of the adhesive medium inclusive of the layer of the explosive adhering thereto will remain intact; although the matrix of the explosive will rupture. Thereby, for various classes of weapons, such as are used in artillery, it is possible to operate within a widened range of application without creating any danger to the operating personnel or to the material. In effect, the ammunition withstands substantially higher accelerations, whereby the speed of firing can be substantially increased through more rapid preparation and braking of the projectile in the cartridge or projectile chamber, as well as the number of the charges. The danger of weapon barrel bursting caused by the charges is hereby eliminated through the use of the present invention.

Transport problems encountered through impact forces are also hereby eliminated, so that the ammunition packings can be constructed relatively simply.

The adhesiveness of the adhesive medium to the projectile wall is excellent. Hereby, the adhesive values lie considerably above the current shear strengths of the explosive. The adhesive medium will adhere to galvanically as well as to cold-phosphated projectile walls.

Also with polished, unalloyed projectile walls are there present the necessary adhesive values. Hereby, the adhesive medium is also suitable for all metallic housings containing explosives, such as for warheads, shaped charges, mines, hand grenades and the like.

What is claimed is:

1. An adhesive medium for the bonding of surfaces in ammunition containing explovive charges, said adhesive medium comprising:
   12 to 30% by weight of a copolymer;
   1 to 8% by weight of an oil-free polyester;
   1 to 8% by weight of epoxy-modified triglyceride;
   6 to 26% by weight of a pigment composition; and
   24 to 66% by weight of a polymeric solvent composition, wherein said copolymer consists of approximately 75% vinyl chloride and approximately 25% vinyl monomers.

2. Adhesive medium as claimed in claim 1, wherein the pigmentation has a composition comprising 1 to 3% by weight of colored carbon black as coloring and cover-forming component, 5 to 20by weight of magnesium-aluminum silicate to improve the adhesion to metal; and 0.1 to 3% by weight of clay for protection againt settling.

3. Adhesive medium as claimed in claim 1, wherein the solvent has a composition comprising 20 to 40% by weight of aromatic hydrocarbons, 1 to 10% by weight of aliphatic hydrocarbons, 1 to 8% by weight of alcohols, and 2 to 8% weight of ester.

4. Adhesive medium as claimed in claim 1, wherein said medium is constituted of 30% PVC interpolymerisate, 3% oil-free polyester, 30% xylol, 7% epoxy-modified triglyceride, 0.5% bentone, 1.5% of carbon black 5% ethyl glycol, 13% talcum, 5% butyl acetate, and 5% white spirits.

5. Adhesive medium as claimed in claim 1, wherein the vinyl monomer is vinyl butyl ether.

* * * * *